United States Patent [19]

Chauvier et al.

[11] Patent Number: 4,861,506

[45] Date of Patent: Aug. 29, 1989

[54] STABILIZED PARTICLES OF PEROXYGEN COMPOUNDS, PROCESS FOR THEIR MANUFACTURE, AND COMPOSITIONS CONTAINING THEM

[75] Inventors: Jean-Marie Chauvier, Jemeppe-sur-Sambre; Léon Moussiaux; Henry Scoman, both of Sambreville, all of Belgium

[73] Assignee: INTEROX (Société Anonyme), Brussels, Belgium

[21] Appl. No.: 158,805

[22] Filed: Feb. 19, 1988

[30] Foreign Application Priority Data

Feb. 19, 1987 [BE] Belgium .............................. 087.00148

[51] Int. Cl.[4] ......................... C11D 3/395; C11D 7/54
[52] U.S. Cl. .................................. 252/95; 252/186.3; 252/186.31; 252/94
[58] Field of Search ....................... 252/98, 99, 186.31, 252/186.25, 186.27, 186.3, 94, 95

[56] References Cited

U.S. PATENT DOCUMENTS 4,259,200  3/1981  Sims et al. .............................. 252/98
4,329,244  5/1982  Brichard et al. ....................... 252/99

FOREIGN PATENT DOCUMENTS 812248   8/1951   Fed. Rep. of Germany .
776485   1/1935   France .
58-74506 5/1983   Japan .
58-74507 5/1983   Japan .
58-74508 5/1983   Japan .
1456591  11/1976  United Kingdom .

OTHER PUBLICATIONS

"Sodium Perborate and Percabonate", Chemical Trade Journal, pp. 1417–1419, Dec. 12, 1952.
Chem. Abstracts, 99:55833y, (1983).
Chem. Abstracts, 99:55834z, (1983).
Chem. Abstracts, 99:90389e, (1983).

Primary Examiner—Paul Lieberman
Assistant Examiner—John F. McNally
Attorney, Agent, or Firm—Spencer & Frank

[57] ABSTRACT

Particles of peroxygen compounds chosen from alkali metal persalts, which particles are stabilized by incorporation of a combination of metal ions including magnesium ions and zinc ions.

5 Claims, No Drawings

STABILIZED PARTICLES OF PEROXYGEN COMPOUNDS, PROCESS FOR THEIR MANUFACTURE, AND COMPOSITIONS CONTAINING THEM

The present invention relates to stabilized particles of peroxygen compounds, a process for their manufacture, and bleaching compositions containing these particles.

It is well-known that inorganic peroxygen compounds, especially alkali metal percarbonates, perphosphates and peroxymonosulphates, may be employed as bleaching agents in powder detergent mixtures.

However, the storage stability of these peroxygen compounds, particularly in moist atmosphere, and their stability towards other constituents of the detergent powders is inadequate.

Attempts have been made to overcome these disadvantages by the use of sodium perborate tetrahydrate as bleaching agent, because it is relatively stable to decomposition in a pulverulent detergent medium. However, the stability of sodium perborate tetrahydrate deteriorates considerably when it is stored at more elevated temperatures.

In order to improve the storage stability of the particles of inorganic peroxygen compounds, it has been proposed to add to them various types of stabilizing agents, such as soluble salts of alkaline-earth metals, particularly of magnesium (see especially Patent FR-A No. 776,485 (Industrieele Maatschappij Voorheen Noury & van der Lande) and Chemical Trade Journal and Chemical Engineer, Dec. 12, 1952, pages 1417 and 1418).

This addition, however, has not enabled the problem of long-term storage stability of these peroxygen compounds at a relatively elevated temperature to be solved in a satisfactory manner.

The present invention is consequently aimed at providing particles of peroxygen compounds which do not exhibit the disadvantages of the known products and which are particularly stable in storage at elevated temperature.

To this end, the present invention relates to particles of peroxygen compounds chosen from alkali metal persalts, which particles are stabilized by incorporation of a combination of metal ions including magnesium ions and zinc ions.

The peroxygen compounds of which the particles of the invention consist are all the alkali metal persalts which are normally unstable. The most widely employed among these are the alkali metal, and more particularly sodium and potassium perborates, percarbonates, perpyrophosphates, pertripolyphosphates, persilicates and peroxymonosulphates. The stabilized particles of peroxygen compounds may contain persalts of one and the same type or a mixture of different persalts.

The invention has been found to be advantageous in the case of particles consisting of the various forms of sodium perborates, namely anhydrous sodium perborate and the perborate mono-, tri- and tetrahydrate. The invention has been found particularly advantageous in the case of the particles of industrial perborates, namely the mono- and tetrahydrate and most especially in the case of the particles of sodium perborate tetrahydrate.

The persalts of which the particles according to the present invention consist may be prepared in any manner known per se. For example, they may be prepared by means of processes in a fluid bed fed with solutions of the precursor alkali metal salt and with hydrogen peroxide (see, for example, U.S. Pat. No. 4,329,244 (Solvay & Cie)). It is also possible to employ other methods of manufacture of persalts, based, for example, on their crystallization from their aqueous solutions. Sodium perborate hydrate, in particular, may be obtained by crystallization from a mixed solution of sodium metaborate and hydrogen peroxide.

The particles of peroxygen compounds are, according to the invention, stabilized by incorporation of a combination of metal ions including ions of at least two different types. These ions of two different types are, on the one hand, magnesium ions and, on the other hand, zinc ions.

The stabilization of the particles of peroxygen compounds is generally assessed as the change in their loss of active oxygen: the more stable the particles are, the smaller is the loss of active oxygen, expressed as a percentage of the initial active oxygen content.

In order that the stability of the particles of the invention may be satisfactory, it is advantageous that they should contain at least 400 ppm (parts per million) of magnesium ions, and preferably at least 500 ppm. Simultaneously, the particles should contain at least 10 ppm of zinc ions, and preferably at least 40 ppm.

Furthermore, the stability of the particles of the invention does not increase significantly in the case of magnesium ion contents higher than approximately 1,000 ppm and, simultaneously, in the case of zinc ion contents higher than approximately 100 ppm.

The best results, insofar as the stability of the particles of the invention is concerned, have been recorded when they contain a combination of magnesium ions, in contents of between 500 and 800 ppm, and of zinc ions, in contents of the order of 80 ppm.

The incorporation of the combination of metal ions in the particles of peroxygen compounds to be stabilized may be carried out by any known means.

A preferred method consists in an operation of spraying an aqueous solution (S) of at least one at least partially water-soluble magnesium compound and of at least one at least partially water-soluble zinc compound onto the particles of persalts and evaporating off the water. This method offers the advantage of resulting in particles of peroxygen compounds on whose surface the stabilizing magnesium and zinc ions are uniformly distributed.

The at least partially water-soluble compounds which may be employed to implement the above method are generally the salts of the metals in question. These may be organic salts or inorganic salts, hydrated or otherwise.

Among the salts which may be employed there may be mentioned:

organic salts, such as magnesium and zinc acetates and lactates, zinc benzoates, magnesium and zinc formates, magnesium salicylate, and zinc butyrate, citrate and picrate, inorganic salts, such as magnesium and zinc nitrates and sulphates, magnesium and zinc bromides, chlorides and iodides, zinc bromates, chromates and fluorosilicates, magnesium iodate, molybdate and thiosulphate and zinc hypophosphite.

The preferred magnesium and zinc compounds are the at least partially water-soluble inorganic salts of these metals; among the latter, it is more particularly preferred to make use of the nitrates and sulphates of these metals and most particularly of the sulphate hydrates, especially for assessibility reasons.

It is self-evident that the use of a number of different compounds of each of the metals in question and/or the use of a number of aqueous solutions containing different metal ions also fall within the scope of the invention, provided that the essential condition of the invention is satisfied, namely that the particles of peroxygen compounds are stabilized by a combination of metal ions such as defined above.

The aqueous solutions (S) of the metal compounds in question are generally employed at a temperature which is slightly below, equal to or slightly above that of the particles onto which they are sprayed. In general, the temperature of the aqueous solutions is between the temperature of the particles onto which they are sprayed and that temperature plus or minus 25° C.

If possible, the concentration of the compound(s) of the metals in question in the aqueous solutions is close to the saturation concentration under the conditions under which the solution is employed. In this manner, the quantity of water to be evaporated off is minimal. In other respects, the general conditions of the spraying are obviously chosen so as to impart the abovementioned Mg and Zn stabilizing ion contents to the particles of peroxygen compound.

The temperatures at which the spraying and the evaporation are performed are obviously chosen depending on the nature of the peroxygen compound. During these operations, the peroxygen compound particles are maintained at a temperature below the decomposition temperature of the peroxygen compound and generally below 90° C. Temperatures of between 30° and 80° C. are generally employed for the evaporation.

The spraying may be carried out using various methods, for example in a fluidized bed, on a turntable, in a rotary drum or in any other similar device known per se.

The evaporation may be carried out at the same time and in the same enclosure as the spraying or in a separate piece of equipment. A continuous process is generally employed. A device such as a fluid bed or any other device which is known per se may be suitable. In this case, the temperature of the fluidized bed will be between 30° and 80° C.

The use of a fluid bed has been found particularly advantageous, firstly because the spraying and the evaporation are performed simultaneously in the same piece of equipment, and secondly because this method makes it possible to obtain a more uniform distribution of the Mg and Zn stabilizing ions.

Any inert gas and particularly air may be employed as a fluidizing gas. This gas may be heated in order to maintain the temperature of the fluid bed at the desired value. Other means of heating such as a tube bundle placed in the fluid bed may also be employed.

A process which is similar but noncontinuous may also be employed.

The stabilized particles according to the invention preferably contain extremely low quantities of stabilizing ions, and this ensures that their active oxygen content is always high. Furthermore, since the quantities of aqueous solutions (S) which are employed are small, the evaporation requires little heat energy.

The present invention also relates to washing or bleaching compositions containing particles of at least one peroxygen compound which are stabilized as described above. In addition to the peroxygen compound(s), such compositions generally contain one or more surface-active agents chosen from cationic, anionic, nonionic, amphoteric or ampholytic surface-active agents such as, for example, those mentioned in the book "Surface Active Agents" by A. M. Schwarz and J. W. Perry or in the "Encyclopedia of Surface Active Agents" vol. I, 1961, and vol. II, 1964, by I. P. Sisley and P. I. Wood, and one or more detergency auxiliaries called "builders", one of the main purposes of which consists in sequestering the metal ions responsible for water hardness, such as, for example, sodium tripolyphosphate, sodium nitrilotriacetate and polyacrylates.

These compositions may also contain other substances chosen as a function of the special field of application of the composition. Among these may be mentioned persalt activators, optical brighteners, foam inhibitors, enzymes, tarnish inhibitors and agents preventing redeposition of soil, disinfectants, corrosion inhibitors, perfumes, colorants, pH regulators, agents capable of releasing active chlorine, and the like.

The stabilized particles of peroxygen compounds according to the invention pass the following test. They do not lose more than 8% of active oxygen when they are kept in solution in water (at a concentration of 30 g of peroxygen compound per liter of water) for 60 minutes at 60° C. The active oxygen content of the particles at the end of the test is measured by the permanganate method. This test is called Test S hereinafter.

The examples which follow illustrate the invention.

EXAMPLE (Test 1 in Accordance with the Invention and Reference Tests 2R and 3R)

Sodium perborate tetrahydrate particles (SPB4) produced by crystallization of a mixed solution of sodium metaborate and hydrogen peroxide are employed.

These SPB4 particles are then dried in a fluidized bed drier. Before entering the latter, they are stabilized using combinations of magnesium ions, zinc ions and tin ions incorporated by spraying onto the particles a solution in which the Mg ions are provided by magnesium sulphate, the Zn ions by zinc sulphate heptahydrate and the Sn ions by tin chloride dihydrate.

The characteristics and the results of the tests carried out are collected in the Table below.

TABLE

| Test | 1 | 2R | 3R |
|---|---|---|---|
| Magnesium content of the SPB4 (ppm) | 800 | — | 800 |
| Zinc content of the SPB4 (ppm) | 80 | 35 | |
| Tin content of the SPB4 (ppm) | — | — | 40 |
| Loss of active oxygen of the SPB4 before stabilization (%) (according to the S test) | 21 | 21 | 21 |
| Loss of active oxygen of the SPB4 after stabilization (%) (according to the S test) | 5 | 13 | 21 |

The results of the tests show that only the SPB4 containing both magnesium and zinc ions in the preferred respective quantities according to the invention (Test 1) shows an active oxygen loss, according to the S test, which is lower than 8% by weight.

We claim:

1. Particles of peroxygen compounds chosen from alkali metal persalts, which particles are stabilized by incorporation of a combination of metal ions, wherein the combination of metal ions comprises about 400 to about 1000 ppm magnesium ions and about 10 to about 100 ppm zinc ions wherein the said amounts of magnesium ions and zinc ions are relative to the peroxygen compounds.

2. A process for the manufacture of particles of peroxygen compounds chosen from alkali metal persalts, which particles are stabilized by the incorporation of a combination of metal ions, comprising the steps of:
  (a) providing particles of a peroxygen compound selected from the group consisting of alkali metal persalts;
  (b) spraying an aqueous solution of metal ions comprising at least one at least partially soluble magnesium compound and at least on least partially soluble zinc compound onto said particles; and
  (c) evaporating water from said sprayed particles to produce stabilized particles comprising about 400 to about 1000 ppm magnesium ions and about 10 to about 100 ppm zinc ions wherein the said amounts of magnesium ions and zinc ions are relative to the peroxygen compounds.

3. A process according to claim 2 wherein said at least partially soluble magnesium compound is an at least partially water-soluble inorganic salt of magnesium.

4. A composition for washing or bleaching comprising at least one surface active agent, at least one detergency auxiliary and particles of peroxygen compounds chosen from alkali metal persalts, said particles being stabilized by the incorporation of a combination of metal ions, wherein said combination of metal ions comprises about 400 to about 1000 ppm magnesium ions and about 10 to about 100 ppm zinc ions wherein the said amounts of magnesium ions and zinc ions are relative to the peroxygen compounds.

5. A process according to claim 2 wherein said at least partially soluble zinc compound is an at least partially water-soluble inorganic salt of zinc.

* * * * *